United States Patent [19]

Zeiler et al.

[11] 3,923,852
[45] Dec. 2, 1975

[54] PREPARATION OF SUBSTITUTED ISOTHIOCYANATES

[75] Inventors: Andrew G. Zeiler, Muskegon; Harry Babad, North Muskegon, both of Mich.

[73] Assignee: Story Chemical Corporation, Muskegon, Mich.

[22] Filed: Jan. 14, 1974

[21] Appl. No.: 433,046

[52] U.S. Cl. ............................................. 260/454
[51] Int. Cl.² ...................................... C07C 161/04
[58] Field of Search .................................. 260/454

[56] References Cited
UNITED STATES PATENTS

| | | | |
|---|---|---|---|
| 1,375,345 | 4/1921 | Backhaus | 252/472 |
| 1,540,448 | 6/1925 | Wilson | 252/472 |
| 3,404,171 | 10/1968 | Ulrich | 260/454 |
| 3,794,642 | 2/1974 | Kress | 260/687 |

FOREIGN PATENTS OR APPLICATIONS

| | | | |
|---|---|---|---|
| 1,024,913 | 4/1966 | United Kingdom | 260/454 |
| 581,338 | 8/1959 | Canada | 260/454 |

OTHER PUBLICATIONS

Houilleres, "Oxidation–Hydration Catalyst", (1960), CA 56, p. 6706 (1962).

*Primary Examiner*—Glennon H. Hollrah
*Attorney, Agent, or Firm*—Cooper, Dunham, Clark, Griffin & Moran

[57] ABSTRACT

Substituted isothiocyanates, such as alkyl isothiocyanates, e.g. ethyl isothiocyanate, are prepared by contacting a reaction admixture formed from an amine, such as a primary amine, and carbon disulfide with gaseous oxygen. The contacting of the reaction admixture with gaseous oxygen is carried out in the presence of a metal, such as manganese ($Mn^{++}$), iron ($Fe^{+++}$), copper ($Cu^{++}$), zinc ($Zn^{++}$), nickel ($Ni^{++}$) and cobalt ($Co^{++}$), as an oxidation catalyst. The reaction admixture containing the amine and carbon disulfide might be an aqueous or non-aqueous reaction admixture. In the preparation of the non-aqueous reaction admixture the amine, together with the carbon disulfide employed in the make-up of the reaction admixture includes a non-aqueous, preferably a water-immiscible solvent, such as methylene chloride, benzene or carbon tetrachloride. An embodiment of this invention is indicated by the chemical equation:

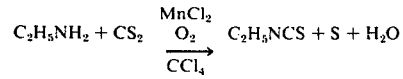

In the above-indicated chemical equation manganese chloride is employed as the oxidation catalyst and carbon tetrachloride as the reaction solvent or carrier.

10 Claims, No Drawings

PREPARATION OF SUBSTITUTED ISOTHIOCYANATES

This invention relates to the preparation of substituted isothiocyanates. It is known to prepare substituted isothiocyanates, see U.S. Pat. Nos. 2,595,723, 2,762,826, 3,859,235, 2,859,236, 2,886,584, 2,894,013, 3,322,810, 3,404,171, 3,406,191 and 3,412,098, see also *Indian Journal of Chemistry* (1970), page 759, the article by G. S. Johar, V. Agarwala and R. P. Bhaskara. The disclosures of each of the above-identified patents and the publication are herein incorporated and made part of this disclosure.

The invention disclosed and claimed in this application is related to the invention disclosed and claimed in copending, coassigned patent application Ser. No. 433,049 filed Jan. 14, 1974 and copending, coassigned patent application Ser. No. 433,048 filed Jan. 14, 1974.

It is an object of this invention to provide a process for the preparation of substituted isothiocyanates.

Another object of this invention is to provide a direct and economical method for the preparation of substituted isothiocyanates.

How these and other objects of this invention are accomplished will become apparent in the light of the accompanying disclosure. In at least one embodiment of the practice of this invention at least one of the foregoing objects will be achieved.

It has been discovered that substituted isothiocyanates are prepared by reacting a primary amine and carbon disulfide with gaseous oxygen in the presence of a metal oxidation catalyst. Particularly useful as the metal oxidation catalyst are such metals as manganese ($Mn^{++}$), iron ($Fe^{+++}$), copper ($Cu^{++}$), zinc ($Zn^{+115}$), nickel ($Ni^{++}$), and cobalt ($Co^{++}$). Desirably, in the practice of this invention the metal oxidation catalyst is provided by a water-soluble salt of one or more of the above-identified metals. The water-insoluble organo salts, such as the naphthenate, the fatty acid salts and the acetylacetonates of the above metals are also useful as catalysts. It appears that once the oxidation reaction is started the metal is complexed by some species in the reaction mixture.

The reaction is carried out in an aqueous or non-aqueous reaction admixture. When the reaction mixture is aqueous, water may be separately added to the reaction mixture or may be included in the aqueous solution or dispersion of one of the added reactants, such as the amine. When the reaction admixture is substantially anhydrous or non-aqueous a solvent is usefully employed. The solvent might be associated with one of the reactants in the preparation of the reaction mixture or may be separately added. The reaction might also be carried out in the presence of water or an aqueous reaction admixture together with a solvent, such as a water-immisicble solvent.

Upon contact of the reaction admixture comprising the amine and carbon disulfide with gaseous oxygen the corresponding substituted isothiocyanate is formed together with elemental sulfur and water. The practice of the invention is illustrated in one embodiment in the accompanying equation:

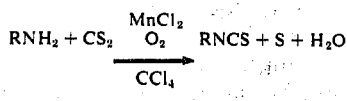

In the above-indicated chemical equation manganese chloride is employed to provide the metal oxidation catalyst and carbon tetrachloride is employed as the reaction solvent or carrier.

In the formation of the reaction admixture comprising the amine and carbon disulfide the amine might be added to the carbon disulfide to form the reaction admixture containing also the metal oxidation catalyst or the carbon disulfide might be added to the amine to form the reaction admixture. The addition of one of the reactants is carried out over a suitable period of time, such as about an hour, more or less, with control of the temperature of the reaction, such as by external cooling, to maintain the temperature of the reaction admixture at a temperature in the range from about 5° to about 30°C., more or less, such as in the range 10°–20°C. or 20°–25°C. Upon completion of the addition of the reactants to form the reaction admixture comprising the amine and carbon disulfide, including a metal oxidation catalyst and a water-immiscible solvent, such as carbon tetrachloride, benzene or methylene chloride, for the product isothiocyanate, gaseous oxygen, either in the form of substantially pure oxygen, oxygen enriched air or air, is introduced into the reaction admixture for a suitable period of time, e.g. for a few hours, such as 1–6 hours, more or less, while maintaining the temperature of the resulting reaction admixture at a temperature in the range from about 5°–10°C. to about 30°C., more or less, such as a temperature in the range 15°–20°C. or 25°–30°C.

The resulting reaction admixture is then filtered to separate any suspended solids (sulfur) present or formed during the reaction and the filtrate treated, such as by evaporation or fractional distillation, for solvent removal and recovery of the product substituted isothiocyanate.

The following examples are illustrative of the practices of this invention. As set forth in each of the accompanying examples a primary amine, $RNH_2$, such as a primary aliphatic or alkyl amine, is admixed with carbon disulfide to form a reaction admixture which is then reacted in the presence of a metal oxidation catalyst, such as manganese chloride, with gaseous oxygen to yield the corresponding substituted isothiocyanate.

EXAMPLE NO. 1

Preparation of Ethylisothiocyanate

A mixture of 21 grams of ethylamine and 37 ml of carbon disulfide was prepared with 200 ml of carbon tetrachloride. One gram of powdered $MnCl_2.4H_2O$ was added and the resulting mixture warmed to about 25°C. Gaseous oxygen was introduced into the resulting mixture. Upon the introduction of gaseous oxygen a sticky solid separated from the resulting reaction admixture. Thereupon, 10 ml of $H_2O$ was added to the reaction mixture and the aforementioned solid dissolved. Oxygen was reintroduced into the reaction admixture and during the introduction of oxygen until the completion of the oxidation the two phases making up the reaction admixture, the aqueous and water-immiscible $CCl_4$ phase, were clear and dark. As the oxidation reaction proceeded sulfur precipitated as well formed crystals and at the completion of the oxidation reaction a brown precipitate was observed. The resulting reaction mixture was then filtered to separate the solids and the filtrate was separated into an aqueous and non-aqueous water-immiscible $CCl_4$ layer. The $CCl_4$ layer was treated by evaporation for solvent removal and there was recovered 36.1 grams of ethylisothiocyanate, a yield of 84%.

EXAMPLE NO. 2

Preparation of Ethylisothiocyanate

A mixture of 0.935 mol of ethylamine and 0.935 mol of $CS_2$ in 250 ml $CCl_4$ was prepared. Ten grams of elemental sulfur were added to the mixture and the resulting mixture stirred for 1 hour. Gaseous oxygen was added to the resulting mixture at a temperature of about 30°C. 0.25 gram $FeCl_3$ was added to the reaction mixture and gaseous oxygen was again introduced thereinto, together with the addition of 20 ml $H_2O$. The oxygen uptake thereupon was more rapid. Upon the completion of the oxidation reaction the resulting reaction admixture was filtered for the removal of sulfur and other precipitated solids and the resulting filtrate was treated with the resultant recovery of ethylisothiocyanate at a yield of 75.5%.

EXAMPLE NO. 3

Preparation of N-butylisothiocyanate

To a reaction mixture made up of 134 ml 28% aqueous $NH_3$ (2 mols) 73.1 grams N-butylamine (1 mol) and 100 ml $H_2O$ there were added 83.7 grams $CS_2$ (1.1 mol) over a period of about 1 hour with cooling to maintain the temperature of the resulting mixture at a temperature in the range 20°–25°C. Thereupon, 0.2 gram of $MnCl_2.4H_2O$ was added along with 200 ml $CH_2Cl_2$. The resulting mixture was then contacted with gaseous oxygen at a temperature of about 20°C. Upon completion of the oxidation reaction the resulting reaction admixture was filtered and the non-aqueous portion of the filtrate vacuum distilled to yield 93 grams of n-butylisothiocyanate at a yield of 81.2%.

EXAMPLE NO. 4

Preparation of Methylisothiocyanate

To a mixture of 1000 ml $CH_2Cl_2$ and 225 ml $CS_2$ were added 190 grams of aqueous methylamine solution (40.85% methylamine) over a period of 2 hours at a temperature in the range 20°–25°C. After stirring an additional 2 hours 2 grams of $MnCl_2.4H_2O$ were added and the resulting reaction mixture was oxidized by introducing thereinto gaseous oxygen as fast as it was absorbed. The reaction mixture was maintained at a temperature in the range 20°–25°C. by cooling. When the oxidation reaction was complete, i.e. when there was no longer any oxygen uptake, the resulting reaction admixture was filtered and the aqueous layer removed. The non-aqueous, water-immiscible $CH_2Cl_2$ layer was washed with 200 ml $H_2O$ and then subjected to fractional distillation. There was recovered methylisothiocyanate in the amount 127 grams at a yield of 70%.

EXAMPLE NO. 5

Preparation of n-Butylisothiocyanate

To a mixture of 74 ml of 28% aqueous $NH_3$ (1.1 mols) 73.11 grams of n-butylamine (1 mol) and 375 ml of water was added 83.7 grams (1.1 mols) of $CS_2$ over a 1-hour period. The mixture was stirred for 12 hours at 25°C. Benzene (100 ml) and $MnCl_2.4H_2O$ (0.2 gram) were added and oxygen was passed into the stirred reaction mixture as fast as absorbed. During the oxidation, the temperature was maintained at 20°–25°C. with cooling. Upon completion of the oxidation, the reaction mixture was filtered and the non-aqueous portion of the filtrate was treated with the resultant recovery of n-butylisothiocyanate at a yield of 81.0%.

In the practices of this invention as set forth in the foregoing examples, emphasis has been placed upon the use of primary alkylamines, such as $C_1$–$C_{30}$ primary alkylamines for the preparation of the substituted isothiocyanates. In addition to alkylamine other primary aliphatic amines are usefully employed in accordance with this invention. In addition to the aliphatic amines the cycloaliphatic amines, particularly the cycloalkylamines, are also useful for the preparation of substituted isothiocyanates in accordance with this invention. Suitable cycloalkylamines include $C_5$–$C_{20}$ cycloalkylamines, such as cyclopentylamine, cycloheptylamine, cyclooctylamine, cyclononylamine, cyclodecylamine, cycloundecylamine and cyclododecylamine.

In general, the primary hydrocarbyl amines made up of only hydrogen, carbon and nitrogen atoms are useful as well as the substituted alkyl primary amines as exemplified by the formula $X-(CH_2)_n-NH_2$ wherein X is an aryl group, a halogen, OH and OR wherein R is an alkyl group containing 1–20 C atoms and wherein $n$ is an integer in the range 1–20, are especially useful in the preparation of the substituted isothiocyanates in accordance with this invention.

Desirably, as indicated in the foregoing disclosure, it is preferred to form the reaction admixture comprising the amine, carbon disulfide, solvent and metal oxygenation catalyst at a temperature below 30°C. and to carry out the oxidation of the resulting reaction admixture with gaseous oxygen also at a temperature below about 30°C. If desired, however, higher temperatures might be employed. Also, as indicated in the accompanying disclosure, it is preferred to carry out the reaction at atmospheric or ambient pressure. If desired, however, higher pressures, such as up to about 10 atmospheres pressure or higher and lower than atmospheric pressures, such as a pressure as low as about 0.1 atmosphere, or lower, might also be usefully employed.

As indicated hereinabove, it is preferred to employ a relatively low boiling organic solvent, such as benzene, in the preparation of the reaction admixture. The water-immiscible, low molecular weight halogenated hydrocarbons, such as the $C_1$–$C_2$ halogenated hydrocarbons, e.g. chloroform, carbon tetrachloride, methylene chloride and mixtures thereof, are especially useful as solvents. In the foregoing examples Example Nos. 3 and 5 employ ammonia as an acid acceptor. In the presence of a water-immiscible solvent the desired isothiocyanate is obtained and in the absence of the water-immiscible solvent the isothiocyanate will react with the ammonia to yield alkylthiourea.

As will be apparent to those skilled in the art in the light of the foregoing disclosure, many modifications alterations and substitutions are possible in the practice of this invention without departing from the spirit or scope thereof.

We claim:

1. A method for the preparation of a substituted isothiocyanate which comprises contacting a reaction admixture formed from and consisting essentially of a $C_1$–$C_{30}$ alkyl or cycloalkyl primary amine, a normally liquid water-immiscible halogenated hydrocarbon or an aromatic hydrocarbon as a solvent for said substituted isothiocyanate and carbon disulfide with gaseous oxygen, the reaction admixture during contact with the gaseous oxygen having incorporated therein a catalytic amount of a metal oxidation catalyst selected from the group consisting of manganese, iron, copper, zinc, nickel and cobalt compounds, the contacting of said admixture being carried out at a temperature in the range 5°–30°C. and recovering from the resulting reaction admixture the substituted isothiocyanate.

2. A method in accordance with claim 1 wherein said metal oxidation catalyst is a water soluble manganese salt.

3. A method in accordance with claim 1 wherein said metal oxidation catalyst is a water-soluble ferric salt.

4. A method in accordance with claim 1 wherein said reaction admixture contains water.

5. A method in accordance with claim 4 wherein said water is added to the reaction admixture after contact of the reaction admixture with gaseous oxygen has been initiated.

6. A method in accordance with claim 1 wherein said reaction admixture is anhydrous.

7. A method in accordance with claim 1 wherein said amine is ethylamine.

8. A method in accordance with claim 1 wherein said amine is n-butylamine.

9. A method in accordance with claim 1 wherein said amine is methylamine.

10. A method in accordance with claim 1 wherein said amine is cyclohexylamine.

* * * * *